United States Patent [19]

Stoll et al.

[11] Patent Number: 4,520,061

[45] Date of Patent: May 28, 1985

[54] ADAPTER BLOCK AND A MOLD FOR PRODUCING SUCH BLOCKS BY FOAM MOLDING

[76] Inventors: Kurt Stoll, Lenzhalde 72, D-7300 Esslingen, Fed. Rep. of Germany; Hans-Heinrich Glättli, Seestrasse 252, Ch-8700 Küsnacht, Switzerland

[21] Appl. No.: 524,042

[22] Filed: Aug. 17, 1983

Related U.S. Application Data

[62] Division of Ser. No. 385,254, Jun. 4, 1982.

[30] Foreign Application Priority Data

Jun. 19, 1981 [DE] Fed. Rep. of Germany ....... 3124020

[51] Int. Cl.³ ........................ F16L 47/00; B32B 3/10; B29C 1/06
[52] U.S. Cl. ...................................... 428/137; 249/64; 249/176; 264/45.5; 264/46.4; 264/162; 285/137 R; 425/468; 425/817 R; 428/160
[58] Field of Search ............. 425/468, 817 R; 249/64, 249/176, 177; 285/137 R; 264/DIG. 83, 45.5, 264/162

[56] References Cited

U.S. PATENT DOCUMENTS

| 3,561,181 | 2/1971 | Bassett | 249/177 X |
|---|---|---|---|
| 3,577,612 | 5/1971 | Susin | 249/64 X |
| 3,588,149 | 6/1971 | Demler, Sr. et al. | 285/137 R X |
| 3,745,203 | 7/1973 | Harper | 264/DIG. 83 |
| 3,747,632 | 7/1973 | Kok et al. | 285/137 R X |
| 3,820,828 | 6/1974 | Fiddler | 285/137 R |
| 3,850,458 | 11/1974 | Gachot et al. | 285/137 R |
| 3,906,177 | 9/1975 | Fiddler | 285/137 R X |
| 3,950,017 | 4/1976 | Beurer | 285/137 R |
| 4,159,099 | 6/1979 | Maguire | 249/177 X |
| 4,208,368 | 6/1980 | Egli | 264/45.5 |

FOREIGN PATENT DOCUMENTS

| 6270 | 1/1980 | European Pat. Off. | 264/45.5 |
|---|---|---|---|
| 742138 | 6/1980 | U.S.S.R. | 249/177 |

OTHER PUBLICATIONS

Stedfeld, Robert, Edt, "Where's the Fizz in Structural Foam", in *Materials Engineering*, Jul. 1978, pp. 20-26.

*Primary Examiner*—Philip Anderson
*Attorney, Agent, or Firm*—Flynn, Thiel, Boutell & Tanis

[57] ABSTRACT

An adapter block having fluid channels is made up of at least two parts bonded together. At least one of the parts is made up of an integral skin foam material, more specially polyurethane. A foam-molded core of this material is covered over by an integrally molded, unfoamed skin. At the faces that are to be bonded the skin is first machined away by a roughening tool. A mold for producing the adapter block is made up of two mold end parts with hollows to take up mold pins so that mold pins or stoppers may be put therein. The mold end part opposite to the end part with the pins is made of an elastically soft material. The mold pins may have concave end faces.

10 Claims, 3 Drawing Figures

ADAPTER BLOCK AND A MOLD FOR PRODUCING SUCH BLOCKS BY FOAM MOLDING

The present application is a divisional application of U.S. Ser. No. 385,254 filed June 4, 1982.

FIELD OF THE INVENTION

The present invention relates to synthetic resin adapter blocks made up of at least two bonded parts, having channels in one outer face thereof for fluid under pressure, and having connection holes running normal to this outer face. The invention furthermore relates to a mold for producing such adapter blocks by a process of foam molding.

BACKGROUND OF THE INVENTION

Multiple connection plugs are coming to be used on an ever-increasing scale for producing connections between fluid-powered units, fluid supply systems and fluid receivers and furthermore for producing connections between fluid logic circuits and sensors and loads used therewith. One useful effect produced in this respect is that they take up little space, while on the other hand there is less danger of producing a wrong connection than with systems in which separate fluid lines of hoses are used.

For making a connection between standard fluid terminals of connection plugs and the separate, different fluid terminals of active and passive fluid components, the special geometry and connection position of such components are taken into account by using adapter blocks. Such adapter blocks have fluid connection or terminals on the one connection face at standard positions, whereas on their other face, opposite thereto, they have connection openings or terminals in keeping with the geometry of the component used therewith. Between these two faces there are channels in the body of the adapter block for producing the desired customized connections, such channels being more specially open and uncovered at the face of the adapter block so that the channels have to be covered over by, and fixed tightly against, the component to be worked using fluid supplied by way of the channels, that is to say so that such channels, which in the first place are open on one side, are covered over and in the form of complete ducts as opposed to open channels or grooves.

In the prior art, such adapter blocks have so far been high in price to make. If only a small quantity is produced, the holes and the open channels are produced by machining from a solid block of material (as a rule, a thermosetting resin). Such machining is, however, heavy on highly trained labor and on the use of high-precision machining systems because of the mechanical properties of the resins used; furthermore, the inner or lining faces of the channels are generally rough.

A further point is that such adapter blocks may only be economically produced by injection molding if large production runs are needed because of the high price of injection molds. If the resin used is a thermosetting one, a heavy press is needed to get the desired mold closing pressure and any further machining still needed after molding, for example because of there being a very complex channel geometry, would be high in price, and the brittle material is likely to be chipped. If, on the other hand, a thermoplastic material is used, there will be the shortcoming of uneven shrinkage and furthermore any later machining that may be necessary is hard to undertake.

SUMMARY OF THE INVENTION

It is for this reason that one purpose of the present invention is that of making it possible for precision-quality adapter blocks to be economically produced, with channels in one outer face thereof and connection holes normal thereto, even in small production runs.

For effecting this purpose, and further purposes, in the present invention an adapter block of the sort noted hereinbefore is so produced that the resin part is made of integral skin foam material and a face thereof is roughened before bonding. The invention furthermore relates to a mold for foam molding and producing adapter blocks, the mold being a negative or complementary mold that is first filled with a material and then foaming and curing of the material takes place. The integral skin molding produced in the negative mold of the adapter block is mechanically roughened after being taken out of its mold.

Although integral skin foam resin as such has been widely used (see Materials Engineering 7/78, pages 20 to 26, European patent application No. 6270, and U.S. Pat. No. 4,208,368) for producing a number of different sorts of components, it and the necessary injection molds have so far not been used for making pneumatic or hydraulic components because the opinion of those in the art was that the bubble-like structure of integral skin foam would not be able to be used with high pressures because of the thin walls of the separate bubbles. However, it has now been seen, as part of the development of the present invention, that integral skin foam material has those special properties which are needed for producing adapter blocks, namely because a strong and smooth skin is produced on the mold inner face without any air bubbles trapped therein and furthermore the material is resistant to high pressures so that there is untroubled, laminar fluid flow over the inner faces of the channels, such smoothness stopping the building up of coatings of dirt on the channel walls. Because this is so, there is no undesired drop in pressure and undesired delay in the fluid pressure signals in passing through the adapter block. On the other hand, on machining back the connection faces so as to be level and flat, the outer face then produced will have a cut-open pore structure so that such an outer face may be used for producing a good joint when placed against the outer face of a component, even if such further outer face is rough. Furthermore, very high-quality adhesive joints may be produced between two such faces. Because of the machining, that is to say mechanical working, of the molding in the process of the invention, the molding will be freed of any parting compound still on it, which might otherwise have an undesired effect on the adhesive joint made with the outer face of the molding.

Adapter block moldings produced in the process of the present invention have a good mechanical strength, a high shock resistance and a low weight.

Furthermore, in the process of the invention, truly cylindrical connection holes may be produced because with integral foam no special taper angle is needed to make it possible for the pins to be pulled out of the molding.

Adapter blocks of integral skin foam material give a further useful effect inasfar as the pressure inside the mold used for foam molding is generally low and, for this reason, the mold locking system does not have to be designed for producing high mold-shutting forces. This is a further useful effect in connection with producing adapter blocks in a small manufacturing plant and in small numbers.

Further useful developments of the invention will be seen from the claims.

As one such possible development of the invention the mold has first and second end parts with pockets therein for the mold pins placed in positions on a standard grid, some of the pockets of the grid which are not needed in a given case being shut off by stoppers whose uncovered outer faces are a small distance short of the inner molding face of the second mold part.

The mold end part opposite to the end part bearing the said pins may be made of an elastic, soft or resiliently yielding material.

The free ends of the pins may be placed at a short distance clear of the molding face of the second mold end part.

Furthermore the mold pins have heads that are taken up in counterbored ends of the pin pockets, such counterbored parts being shut off free of play by a support plate placed thereon. Such a design of the mold makes it simpler for it to be matched to the different designs of the adpater. The ends of the mold pins may have concave end faces.

Such further outgrowths of the invention make it simpler for the second end part to be used with different first end parts. A further useful point is that, even when the geometry of the parts is poor and they not not make good contact with each other, it is still not possible for resin material to make its way in between the end face of a mold pin and the first mold end part.

Generally it may be said that the mold for foam molding in keeping with the present invention makes it possible for the functions of the first mold end part and that of the second mold end part to be kept quite separate from each other. In fact, the first end part is only for seeing that the surface channels are formed in the one connection face of the adapter block, whereas the second mold end part together with the mold pins thereon is only for producing the connection holes. This makes possible a simple structure of the mold for foam processing, adaptable use of the mold for different sorts of adapter blocks, simple upkeep of the mold, simple removal the adapter block as produced by foam molding, and a free selection of the material for making the first mold end part, such material more specially being a tough but soft elastic material which would be of little use for later machining. A mold whose first mold end part is made of soft material makes it possible for the mold pins to be rested against this mold end part fully and firmly so that it will not be possible for the resin to get inbetween at the points of contact of the mold pins on this mold end part and there will then be no fash or thin skins formed here, that would make fettling of the adapter blocks necessary after they had been taken from the mold.

BRIEF DESCRIPTION OF THE DRAWINGS

An account of the invention will now be given using one working example, to be seen in the figures.

DETAILED DESCRIPTION

Figure 1:
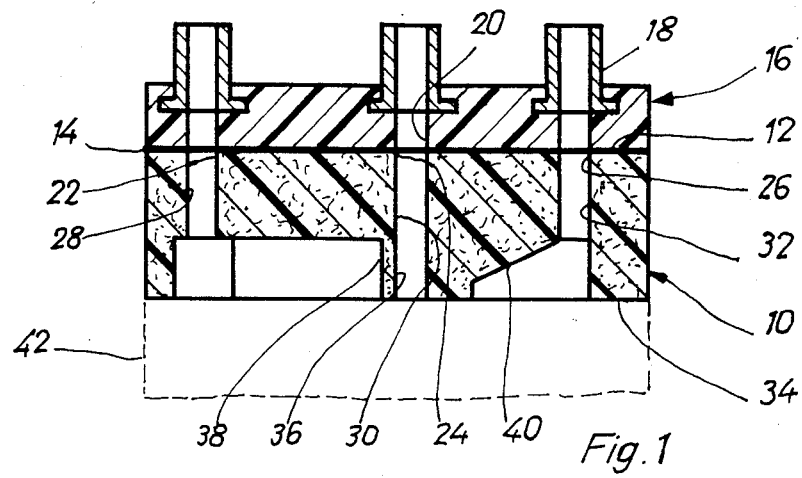
FIG. 1 is a sectional side view of an adapter block made of an integral skin foamed resin, and a connection plug part joined therewith.

In FIG. 1 the reader will see a molded adapter block, that is to say a block used in fluid systems. Such blocks are furthermore named mounting blocks in the art. In the present case the block 10 is produced from integral skin foam material, that is to say a foamed resin with an unfoamed outer skin integrally joined to a foamed inner mass, and made for example of polyurethane. It has a top connection face 12 on which there is an adhesive coating 14 joining it with a standard plug 16 made of resin.

Molded into the standard plug 16 are a number of male metal plug pins 18 which may be plugged into the female connection pockets of a female plug to make a fluid-tight connection. The male plug pins 18 are placed at standard positions on the standard plug 16 and are lined up with fluid channels 20 of the standard plug 16.

The adapter block molding 10 has in its top connection face 12 an equal number of connection holes 22, 24 and 26 which are lined up with some of the fluid ducts 20 of the standard plug 16. At male pins 18 of the standard plug 16 which are not needed and do not have any fluid connection function, there is no opening in the face 12 so that the fluid duct 20 comes to an end at such face fluid-tightly.

Connection openings 22, 24 and 26 are joined up with holes 28, 30 and 32 of the adapter block molding 10, hole 30 running straight through molding 10 as far as a lower connection face 34 in which it is responsible for forming a connection opening 36.

Connection holes 28 and 32 are placed opening into recesses or channels 38 and 40 produced in the lower connection face 34 so that there is a connection by way of parts that are out of line between such holes 28 and 32 and a pneumatic component 42, which is only marked roughly in broken lines and which is fluid-tightly and adhesively joined with the lower connection face 34 of adapter block molding 10.

Block molding 10 is made of a polyurethane hard foam with an integral skin. It is produced by foaming liquid compound in a foaming mold for producing the connection holes and the channels, the walls of such channels being in fact produced with a dense, smooth skin of the molding resin, although the block may be made using another process, as for example casting. At such connection faces 12 and 34 such resin skin is taken off by machining such faces along level planes after the molding has been taken from the mold.

Figure 2:
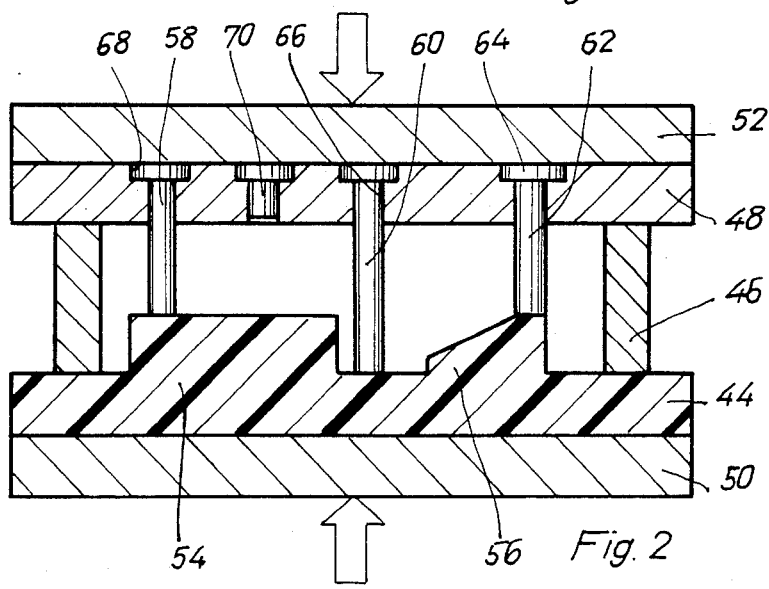
FIG. 2 is a sectional side view of a mold for producing an adapter block as in FIG. 1 by foaming a molding compound.

A foaming mold as presented in FIG. 2 for producing the adapter block molding 10 has as its main part a lower mold end part 44, an inbetween frame 46 of aluminum which is shut off on all sides, a top mold part 48, and lower and upper plates or platens 50 and 52.

The lower mold end part 44 is produced by casting using a positive pattern of the lower side of the adapter block, which only has the channels, the mold part 44 being made of somewhat giving or elastic resin. For this reason, the lower mold end part 44 has projections or lips 54, 56 representative of channels 38 and 40. For molding out the connection holes 28, 30 and 32 there are cylindrical mold pins 58, 60 and 62, each having a top head 64. The mold pins 58, 60 and 62 are seated in openings or pockets 66 of the top mold part 48 with a sliding fit. Pockets 66 are counterbored at 68 to take up heads 64.

The top mold end part 48 has pockets 66 at all points at which, for different adapter blocks, connection holes may be desired, that is to say at the positions of standard plugs. Those pockets 66 which are not needed for producing one given sort of adapter block molding 10 are shut off by stoppers 70 whose free end face is at a small distance from the general outline of the inner face of the top mold part 48.

By the use of the top platen 52, the mold pins and stoppers have their heads fixed and kept in the counterbored parts 68 without any axial play, the lower platen 50 supporting the lower mold end part 44, which is soft and elastic to a certain degree, when foaming of the polyurethane compound is taking place within the mold. The forces needed for keeping the mold shut are marked by arrows diagrammatically in FIG. 2. These forces are, however, in all so small that only simple mold shutting fittings are needed, that is to say the molding operation may be undertaken without a press.

Figure 3:
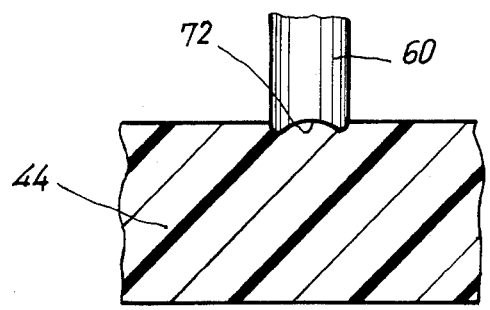
FIG. 3 is a fragmentary sectional side view of a part of the lower mold end part of the mold to be seen in FIG. 2 with a mold pin elastically forced thereagainst.

As may be seen from FIG. 3, the mold pins, as for example mold pin 60, have a hollow end face 72 so that there is a sort of skirt or lip round the lower end of the mold pin which may be forced into the elastically giving material of the lower mold end to make certain that no foaming material will make its way into a position between the lower end of the mold pin and the opposite face of the lower mold end part 44.

For producing adapter block moldings of a given sort, it will only be necessary for mold pins of the desired length to be placed at the desired points in the top mold end part 48 while the other pockets 66 are shut off with stoppers 70. After this preparation the mold end part 48 may be used together with its inbetween frame 46 and its lower mold end part 44.

For producing a block molding, the inner mold faces are sprayed with a parting material and then the polyurethane mixed foam compound is forced into the mold, which is then shut, the worker then waiting till the material inside the mold has become solid. The mold is then opened and, using ejectors, which are not detailed in the figures and which are placed in holes in the top mold end part 48, the completed block molding is forced out of the inbetween frame 46.

After taking the molding from the mold, the top and lower end faces are machined by milling or grinding to make them ready for adhesively sticking them to another component.

Because the pressure inside the mold does not go up to greater than 5 bar, the molds do not have to be very strong and may, for example, be made of aluminum or synthetic resin, a specially important fact being that the negative mold necessary for molding the channels may be produced by casting from a positive mold using a synthetic resin as for example polyurethane with a certain degree of elasticity and with a high impact strength. The use of an integral skin foam is responsible for a dense and smooth outer face which is no attraction for dirt in the air or other fluid going through the molding in later use with low wall friction and, for this reason, drops in pressure are not produced. Foamed resin plates have a very much lower modulus of elasticity than solid thermosetting plates and, for this reason, when placed in the press used for adhesive joining, readily take up any tolerances in the parts with which they are joined to make it possible for structures to be taken out of the mold without any pulling force. On grinding the outer faces of the separate integral skin foam resin plates a solid layer of skin is ground off so that a large number of pores will be opened up. At the same time any parting material still on the face of the molding will be taken off, which otherwise might have undesired effects on the adhesive joint produced, as would dust produced on grinding. The outer face will in fact be rough, this being a very useful property for the later adhesive sticking operation; in addition to the increase in the surface area responsible for this sort of interlocking effect, the cut-open pores, which are otherwise still shut off, may take up great amounts of adhesive so that there is less need to keep a careful eye on the amount of adhesive used for producing the adhesive coating. For reasons of mechanical strength and resistance while at the same time giving good adhesive properties, the synthetic resin may be more specially a thermosetting integral skin hard foam of polyurethane, although, however, thermoplastic hard foam resins may be used. Plates of unfoamed synthetic resin made by casting are higher in price, are more brittle, are heavier and they may not be so readily squeezed to take up pore tolerance in other parts with which they are joined, this being because such material does not so readily undergo an elastic and/or plastic change in form. Solid material furthermore has a markedly higher density; putting it differently, more resin is then needed.

Lastly, with the mold then opened, the foamed resin plate is pushed clear of the mold pins (for producing the holes) by ejector pins. Nextly the ejector pins are pulled back by a pull-back plate.

The block structure to be produced is made by sticking together a number of such plates, which then undergo face-grinding. Specially high quality blocks with integrated connections are produced by sticking special assembly plates for the pneumatic elements, made of a compact thermosetting material such as phenol resin, on the channel or connection block. The same process may furthermore be used for connection parts of multi-pin plugs; a useful design in this respect is for example in the form of a multiple bush strip with molded-in holes for taking up plugged-in nipples having U-ring gaskets and which furthermore has threaded bushes or the like taken up in the material. It should be noted that the process of roughening the surface of the adapter block may be performed not only in a mechanical, but also in an equivalent, e.g. chemical, way.

The embodiments of the invention in which an exclusive property or privilege is claimed are defined as follows:

1. An adapter block for use in a fluid system, comprising first and second parts and adhesive means for securing said first and second parts together; wherein said first part is made of a plastic material, has a recess provided in a first surface thereof, and has a connecting bore which extends therethrough from a second surface thereon to said recess in said first surface, said plastic material being an integral skin foam material which includes a foam core and a solid exterior skin integral with said foam core; and wherein said first part has said second surface on a side thereof which has been mechanically roughened, said second part being secured by said adhesive means to said second surface of said first part.

2. The adapter block according to claim 1, wherein said first part includes a further connecting bore which extends therethrough from said second surface to a location on said first surface spaced from said recess therein.

3. The adapter block according to claim 2 wherein said second part of said adapter block has means defining fluid channels therein which are each aligned with and in fluid communication with a respective one of said connecting bores in said first part, and including plural male plug pins secured to and projecting outwardly from said second part on a side thereof remote from said first part, each said plug pin having an opening therethrough which is aligned with and in fluid communication with a respective said channel in said second part.

4. The adapter block according to claim 1, wherein said mechanical roughening of said side of said first part effects removal of a portion of the integral exterior skin of said adapter block, whereby said second surface on said first part of said adapter block is a surface on said foam core thereof.

5. The adapter block according to claim 1, wherein said integral skin foam material is a foamable synthetic material which is a polyurethane.

6. A mold apparatus for producing an adapter block for use in a fluid system, comprising first and second mold end parts and means for defining a mold cavity therebetween, said first mold end part having means defining plural mold pin receiving openings therein which extend between said mold cavity and a surface of said first mold end part facing away from said mold cavity and which are arranged in a predetermined, standard pattern, said first mold end part having means defining counterbores in said surface thereof which are each of larger diameter than and are aligned with a respective said mold pin receiving opening; including a plurality of stoppers and a plurality of mold pins which are each removably disposed in a respective said mold pin receiving opening and which each have a head which is disposed in the associated counterbore, each said mold pin extending across said mold cavity and having a free end remote from its head which can engage a surface portion on said second mold end part, and each said stopper having a free end remote from its head which is disposed within the associated mold pin receiving opening; and including a support plate which is releasably secured to said surface of said first mold end part.

7. The mold apparatus according to claim 6, wherein said second mold end part is made of an elastically flexible material, said free end of each said mold pin, when in engagement with said second mold end part, effecting a slight elastic deformation of said second mold end part in the region of the associated surface portion thereof.

8. The mold apparatus according to claim 6, wherein said free end of each said stopper is spaced a small distance from a mold surface on said first mold end part which is a surface of said mold cavity.

9. The mold apparatus according to claim 6, wherein said free end of each said mold pin has a generally concave end surface.

10. The mold apparatus according to claim 6, wherein said second mold part has a mold cavity surface thereon which faces said mold cavity and has means defining a projection on said mold cavity surface which projects into said mold cavity, said projection having thereon one of said surface portions engaged by a respective one of said mold pins.

* * * * *